United States Patent [19]
MacDonald et al.

[11] Patent Number: 5,586,325
[45] Date of Patent: Dec. 17, 1996

[54] METHOD FOR THE DYNAMIC ALLOCATION OF ARRAY SIZES IN A MULTIPROCESSOR SYSTEM

[75] Inventors: Thomas A. MacDonald, Minneapolis; Janet M. Eberhart, Saint Paul; Douglas M. Pase, Burnsville, all of Minn.

[73] Assignee: Cray Research, Inc., Eagan, Minn.

[21] Appl. No.: 165,379

[22] Filed: Dec. 10, 1993

[51] Int. Cl.$^6$ ........................................ G06F 9/00
[52] U.S. Cl. ........................................ 395/706
[58] Field of Search ........................ 395/650, 700

[56] References Cited

U.S. PATENT DOCUMENTS

| | | | |
|---|---|---|---|
| 4,524,416 | 6/1985 | Stanley et al. | 395/410 |
| 4,730,249 | 3/1988 | O'Quin, II et al. | 395/700 |
| 4,744,028 | 3/1988 | Karmarkar | 364/402 |
| 4,761,737 | 8/1988 | Duvall et al. | 395/419 |

OTHER PUBLICATIONS

Micro Soft Press, Computer Dictionary, 1994 (1993), p. 379.
Tom MacDonald, et al. "Addressing in Cray Research's MPP Fortran," *Proceedings, Third Workshop on Compilers for Parallel Computers*, ACPC/TR, Jul., 1992.
Erik P. DeBenedictis, et al. "Extending Unix for Scalable Computing," *Computer*, vol. 26, No. 11, pp. 43–53, Nov., 1993.
David Loveman, "Element Array Assignment–the FORALL Statement," *Proceedings, Third Workshop on Compilers for Parallel Computers*, ACPC/TR, Jul., 1992.
Min–You Wu, et al., "DO and FORALL: Temporal and Spacial Control Structures," *Proceedings, Third Workshop on Compilers for Parallel Computers*, ACPC/TR, Jul., 1992.
Philip J. Hatcher, et al., "Compiling Data–Parallel Programs for MIMD Architectures," *Proceedings, Third Workshop on Compilers for Parallel Computers*, ACPC/TR, Jul., 1992.
Barbara Chapman, et al., "Programming in Vienna Fortran," *Proceedings, Third Workshop on Compilers for Parallel Computers*, ACPC/TR, Jul., 1992.

*Primary Examiner*—Kevin A. Kriess
*Assistant Examiner*—John D. Chavis
*Attorney, Agent, or Firm*—Schwegman, Lundberg, Woessner & Kluth, P.A.

[57] ABSTRACT

A method of setting array boundaries in order to simplify addressing across processor elements in a distributed memory system having global addressing. Each dimension of an array is examined to determine a lower bound, a declared upper bound and an implicit upper bound. The lower bound and the declared upper bound in each dimension are used to set limits for operations on array elements while the implicit upper bound calculated from the lower bound and the declared upper bound is used in calculating the location (processor element and offset) of a particular array element.

17 Claims, 7 Drawing Sheets

| NAME | DIMENSIONS | FIRST DIMENSION | | | ... |
| --- | --- | --- | --- | --- | --- |
| | | LOWER BOUND | DECLARED UPPER BOUND | IMPLICIT UPPER BOUND | |
| ... | ... | ... | ... | ... | |

FIG. 3

METHOD FOR THE DYNAMIC ALLOCATION OF ARRAY SIZES IN A MULTIPROCESSOR SYSTEM

BACKGROUND OF THE INVENTION

1. Field of the Invention

The present invention pertains generally to the field of high speed digital processing systems, and more particularly to a method of modifying the extent of an array dimension in order to simplify addressing across processor elements.

2. Background Information

Massively parallel processing systems have received a great deal of attention because of their potential for orders of magnitude increases in processing power over conventional systems while maintaining competitive costs. One such massively parallel (MPP) system is illustrated in the block diagram of FIG. 1A. As can be seen in FIG. 1A, massively parallel processing system 100 includes hundreds or thousands of processing elements 102 (PE's) linked together by an interconnect network 104. System 100 of FIG. 1A is a distributed memory system in that system memory is distributed as individual local memories 106 connected to each processor element 102. Typically, each processor 102 has a favored low latency, high bandwidth path to a group of local memory banks within an associated local memory 106, and a longer latency, lower bandwidth access to the local memory 106 associated with other processor elements 102 over interconnect network 104. The longer latency memory referenced across the interconnect network is typically referred to as remote or global memory. References to such remote memory 106 traverse interconnect network 104 to some uniquely identifiable processor element 102 attached to network 104.

Memory in system 100 is distributed as local memories 106 connected to each of the processor elements 102. It can be advantageous in such an architecture to address all memory within system 100 as if it occupied a single address space but with a non-uniform access time. In such a globally addressed system, memory references are first examined to see if they are addressing the local memory 106 associated with the issuing processing element 102. If not, the request is routed out onto network 104 to the appropriate processor element 102. One embodiment of a method of routing data across a toroidal mesh interconnect is described in U.S. patent Ser. No. 07/983,979, entitled "DIRECTION ORDER ROUTING IN MULTIPROCESSING SYSTEMS," filed Nov. 30, 1992, by Thorsen, which disclosure is hereby incorporated by reference.

The global address model permits data objects distributed across all of the PE's to be viewed as if there were a single address space. In one approach described by MacDonald et al. in *Addressing in Cray Research's MPP Fortran*, Proceedings of the Third Workshop on Compilers for Parallel Computers, July 1992, data distribution is defined through a set of directives that indicate how a data object is to be distributed.

No matter what approach is taken for data distribution, each memory reference to an element within that data object must be analyzed to extract the processor element 102 where the element is located and the offset into the local memory 106 of that PE 102 needed to access the element. The calculation of the PE number and the offset is nontrivial; the complexity of the calculation grows with the number of dimensions that are distributed across processor elements. Methods for extracting the PE and offset from an address in a globally addressed distributed memory system are well known in the art. For instance, two methods are described in the MacDonald et al. reference cited above, which is hereby incorporated by reference. Typically, such methods rely on a number of time consuming integer division and integer modulus operations. MacDonald et al., however, shows that these calculations can be streamlined by requiring that all dimensions have an extent (or size) that is a power of two. Such an approach simplifies PE and offset extraction by converting integer division to right shifts, modulo operations to masking operations and multiplications to left shifts, all of which are faster operations. In addition, such an approach is inherently simpler to implement in hardware.

To capitalize on this simpler approach, commercial globally addressed distributed memory massively parallel processing systems by Thinking Machines and by MassPar require that arrays be defined such that the extent of each dimension in the array is a power of two. Programmers programming in such extent-constrained systems must keep these dimension extent restrictions in mind. Typically, the only help the programmer receives, however, in following these constraints is in the form of a compiler error message generated when the compiler reviews the program code and finds that the extent of an array dimension is other than a power of two. The programmer must then revise the program code to bring the extent of each of the array dimensions to a power of two. Such a limitation is especially onerous when one may wish to define an array dimension as a function of some run time variable.

There is a need for a method of defining array bounds which permits the simpler power of two addressing while at the same time granting programmers greater flexibility in specifying the extent of an array dimension within their program code.

SUMMARY OF THE INVENTION

The present invention provides a method of setting array boundaries for simplified addressing across processor elements in a distributed memory system having global addressing. Each dimension of an array is examined to determine a lower bound, a declared upper bound and an implicit upper bound. The lower bound and the declared upper bound are then used as limits for operations on array elements while the implicit upper bound is used in calculating the location (processor element and offset) of a particular array element. The lower bound and the declared upper bound are declared within (or default from) the array declaration statement. The implicit upper bound is calculated at either run time or at compile time by determining the extent of an array dimension, rounding that extent to an integer power of N and correcting for the lower bound in that dimension. In one embodiment, the extraction of the processor element and the offset is simplified by setting N equal to two.

According to another aspect of the present invention, a method of compiling program code is described for handling arrays whose bounds are determined at run time. According to the method, a symbol table is provided. The symbol table has an array entry for each declared array; the array entry includes an array identifier, the rank of the array and, for each dimension, a lower bound, a declared upper bound and an implicit upper bound. At compile time, a known memory location is set aside for each bound. In cases where the bounds are known at compile time, the bounds are recorded into their known memory locations for use by the run time code. In the cases where one of the bounds is to be determined from run time expressions however, the array declaration statement is replaced with object code which calculates the desired bound from the run time expression. Object code is then added to calculate the implicit upper bound and to store the calculated bounds in the known memory locations.

BRIEF DESCRIPTION OF THE DRAWINGS

FIG. 3 is a table illustrative of a symbol table which can be used within the present invention;

DETAILED DESCRIPTION OF THE PREFERRED EMBODIMENTS

In the following Detailed Description of the Preferred Embodiments, reference is made to the accompanying Drawings which form a part hereof, and in which is shown by way of illustration specific embodiments in which the invention may be practiced. It is to be understood that other embodiments may be utilized and structural changes may be made without departing from the scope of the present invention.

Figure 1A:
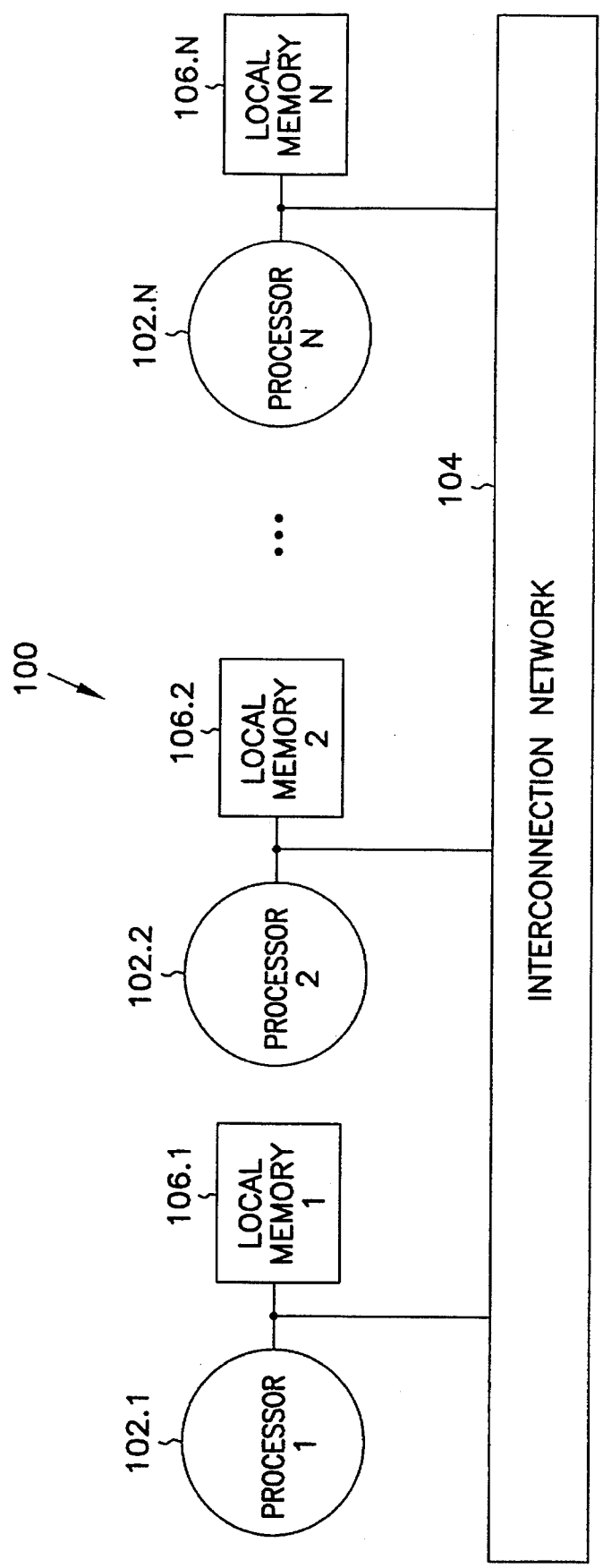
FIGS. 1A and B are block diagrams of distributed memory multiple processor systems.
Figure 1B:
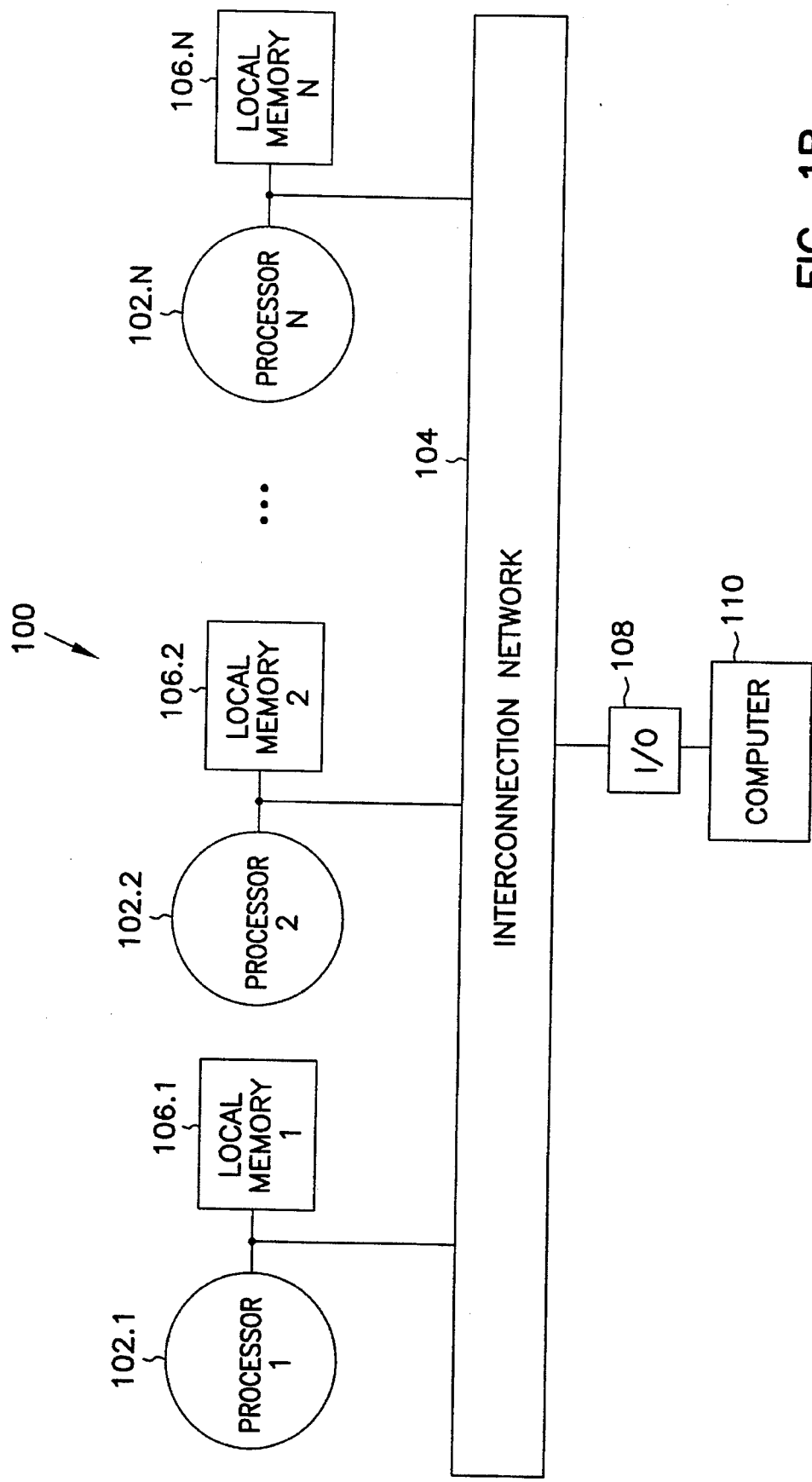
Figure 2:
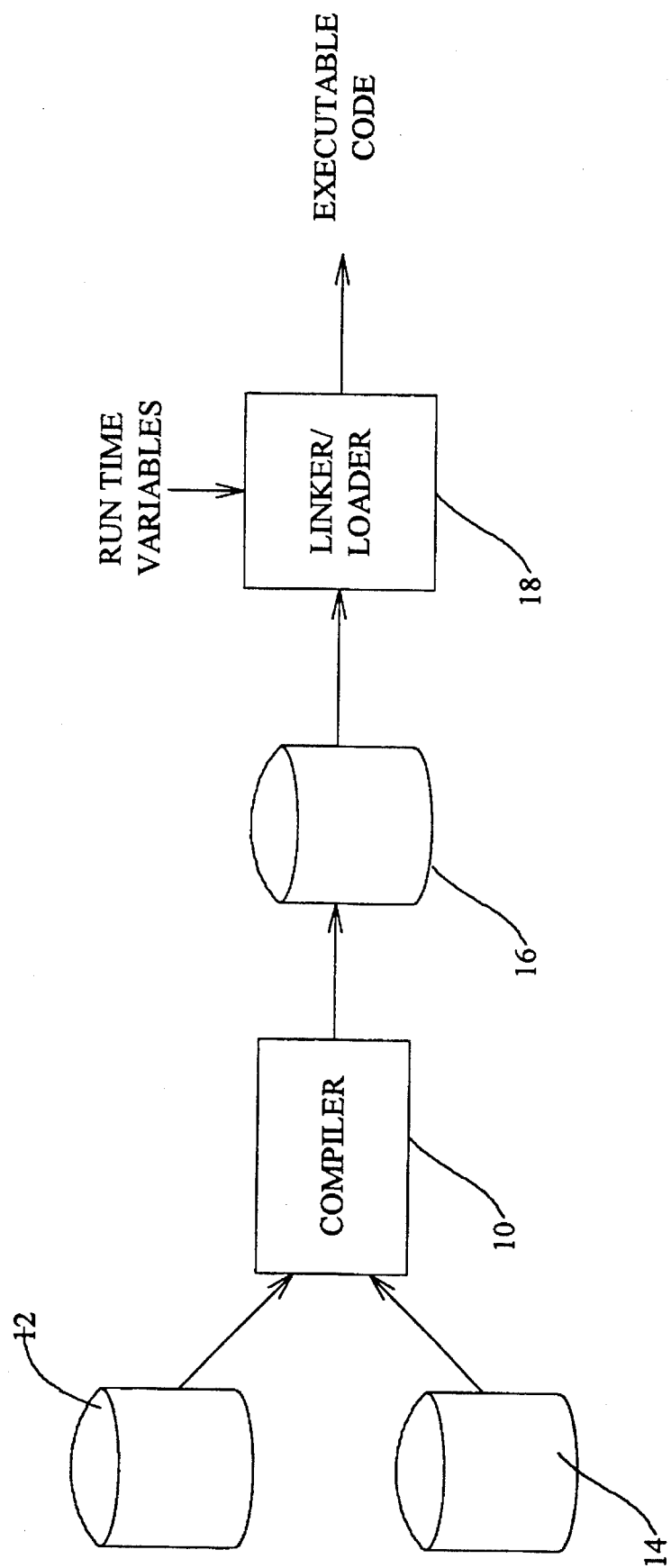
FIG. 2 is a flow diagram showing program code being compiled into executable code.

A flow diagram of program code being compiled into executable code is shown generally in FIG. 2. In FIG. 2, compiler 10 starts by reading program code 12 and library routines 14. Compiler 10 analyzes program code 12 and library routines 14 and generates object code 16. At link time, a linker/loader 18 resolves any link time expressions and loads the resulting executable code into one or more processor elements 102. Upon execution any run time expressions are evaluated and the program proceeds. In one embodiment, in a system such as is shown in FIG. 1B, compiler 10, library routines 14 and linker/loader 18 are software programs residing on a separate computer 110 connected to interconnect network 104 by an I/O channel 108. In such an embodiment, computer 110 is used to compile and link the code. In another embodiment, compiler 10, library routines 14 and linker/loader 18 may be placed within one of the processing elements 102 for execution within MPP system 100. The resulting object code 16 is distributed to each PE 102 allocated to run that object code.

During compile time, every data object taken from program 12 or library routine 14 is described by compiler 10 within a symbol table entry in a symbol table. Symbol table entries contain the critical parameters of each data object. In the case of an array, the symbol table entry, among other things, keeps track of the array name, the number of dimensions (the rank) and the extent of each dimension in the array. A symbol table which can be used to simplify addressing while giving the programmer flexibility in defining an array is shown generally in FIG. 3. In FIG. 3, symbol table 30 has a symbol table entry 31 for each array. Each symbol table entry 31 includes an array name 32, rank 34 and an array dimension field 35 for each dimension. Each array dimension field 35 includes a lower bound 36, a declared upper bound 38 and an implicit upper bound 40, where lower bound 36 and declared upper bound 38 define the declared extent of that dimension. Although only a single dimension field 35 is shown in symbol table 30, it should be apparent that one or more additional dimensions could be defined in field 42 simply by declaring a lower bound 36, a declared upper bound 38 and an implicit upper bound 40 for that dimension and by setting rank 34 to the proper rank.

In defining an array, the user provides a array declaration statement containing, at a minimum, the array name 32, its rank 34 and a declared upper bound 38 for each dimension. Typically, the lower bounds 36 can be established by default.

In order to free the programmer from constraining all arrays to dimension extents which are powers of two, symbol table 30 instead provides two separate upper bounds. The first upper bound, declared upper bound 38, is the upper bound declared by the user. It is used to set the upper limit on operations within that dimension of the array. The second upper bound, the implicit upper bound 40, is calculated by compiler 10 by rounding the dimension extent for that dimension to a higher power of N. The rounded dimension extent is then corrected for the lower bound 36 corresponding to that dimension to form implicit upper bound 40. Implicit upper bound 38 therefore provides the power of N dimension constraint required for simplified addressing.

In implementing a system according to the present invention, N can be any integer number which simplifies calculation of the PE and offset. In one embodiment, N is set to two in order to benefit from the simplifications inherent in binary digital logic when the extents of all array dimensions are powers of two. In one such embodiment, the extent of a dimension is rounded to the next higher power of two in order to minimize the amount of memory dedicated to undefined elements 54. In general, however, it has been found to be advantageous to set N to the number of logic levels available in the particular hardware implementation.

Figure 4:
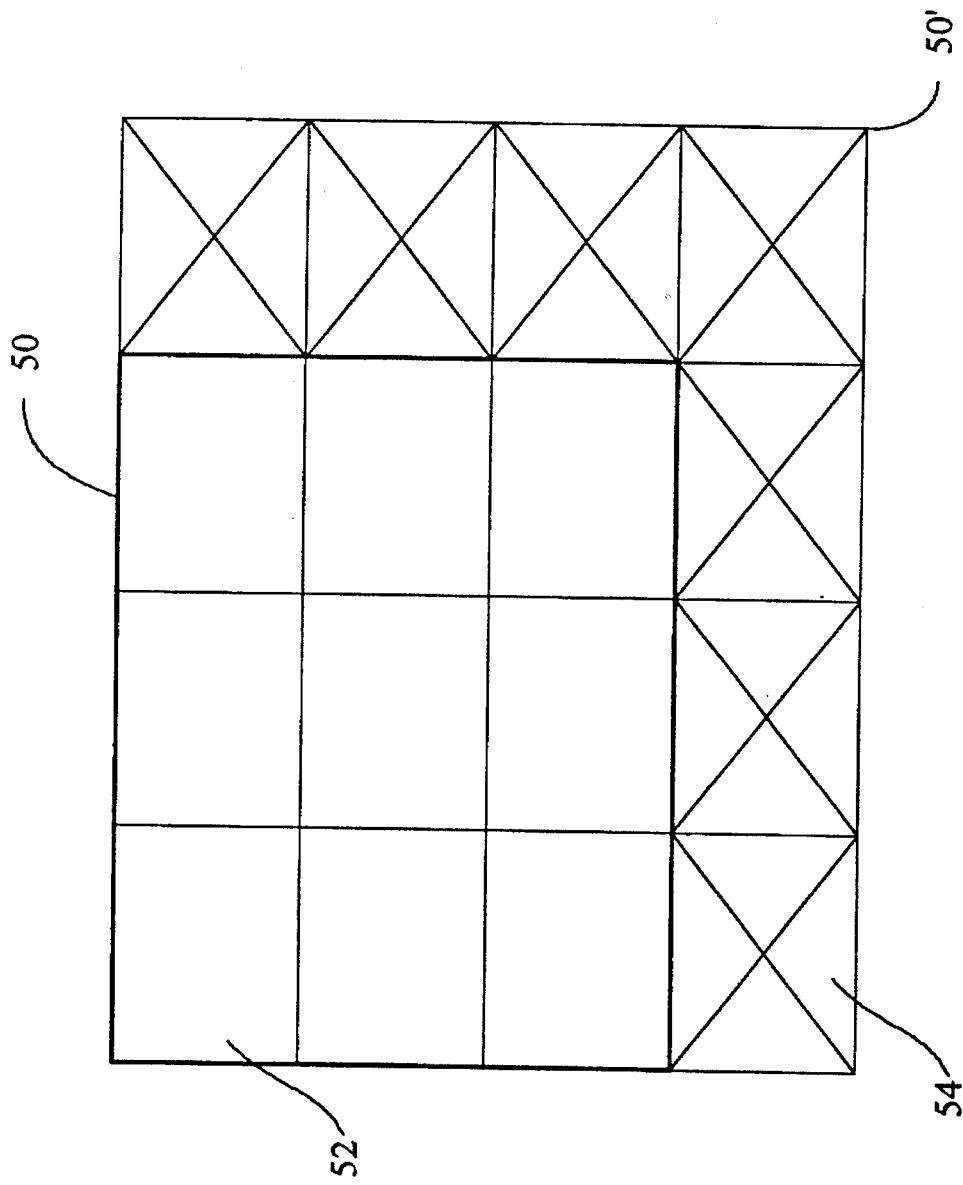
FIG. 4 is an illustration of an array with both declared and implicit upper bounds according to the present invention.

An example of the use of the two types of upper bounds 38 and 40 is illustrated in FIG. 4. In FIG. 4, array 50 has nine elements 52 distributed as a 3×3 array (an array of rank two). Operations on such an array typically are of the form:

```
       DO 10 I=1,3
          DO 10 J=1,3
10           CALL F(A(I,J))
``` where F(A(I,J)) is some operation on array 50 and where 3 and 3 are the upper bounds of I and J, respectively.

In situations where it is advantageous to constrain the array to dimension sizes which are powers of two, array 50 can be restructured as a 4×4 array 50' having valid elements 52 and undefined elements 54 (marked by x's). In such an array, valid elements 52 are still only present in the original 3×3 array 50; elements 52 are distributed, however, as determined by their place in the 4×4 array 50'. Therefore operations on array 50 would still look like:

```
       DO 10 I=1,3
          DO 10 J=1,3
10           CALL F(A(I,J))
``` but now 3 and 3 are only the declared upper bounds of array 50. The location of each element 52 in array 50 must now be calculated from the implicit upper bound of four while compiler 10 will use the declared upper bounds of three to restrict operations on elements of array 50 to valid elements 52. (Elements 54 may be undefined. Therefore, operations on those elements 54 could lead to program termination through, for example, a divide by zero error. Compiler 10 could, of course, initialize all elements 54 to some known, nonzero value but that would not necessarily prevent other exceptions from occurring. It is simpler to just ignore all undefined elements 54.)

During compile time, compiler 10 sets aside, for each dimension, a memory location for lower bound 36, a memory location for declared upper bound 38 and a memory location for implicit upper bound 40. In one embodiment, if an array bound can be determined at compile time, a constant is placed within the object code as part of each instruction requiring that array bound. Otherwise, compiler 10 inserts object code into the compiled code which evaluates the undefined bounds at run time and stores the result into the appropriate memory location.

In another embodiment, the object code is written such that operations always access the pertinent bound memory location. That is, object code performing an operation on an array element references the declared upper bound 38 memory location while object code intended to locate an array element uses the implicit upper bound 40 memory location. If these bounds can be determined at compile time, a constant is written into each of the memory locations. Otherwise, compiler 10 inserts object code into the compiled code which evaluates the undefined bounds at run time and stores the result into the appropriate memory location.

In such an embodiment, by setting aside these known memory locations and by using these known locations for address calculations and indexing, the evaluation of the bounds is decoupled from the execution of the run time code. The memory location associated with the declared upper bound is used for operations (such as setting an upper limit) requiring the declared upper bound while the memory location associated with the implicit upper bound is used for addressing into the array. When a value is placed in those memory locations is immaterial as long as the value is present before a reference requiring that value is made.

A system which operates on both a declared upper bound and an implicit upper bound has two advantages. Addressing is simplified by constraining array dimensions to extents which are powers of N. At the same time, since some problems are more naturally represented by dimension extents which are not powers of two, programmers can write code free from the constraint of what can, at times, be an unnatural array size. Therefore, by transferring the responsibility for tracking dimension extents away from the programmer and to compiler 10, this system provides a programming convenience which enhances programmer productivity.

Figure 5:
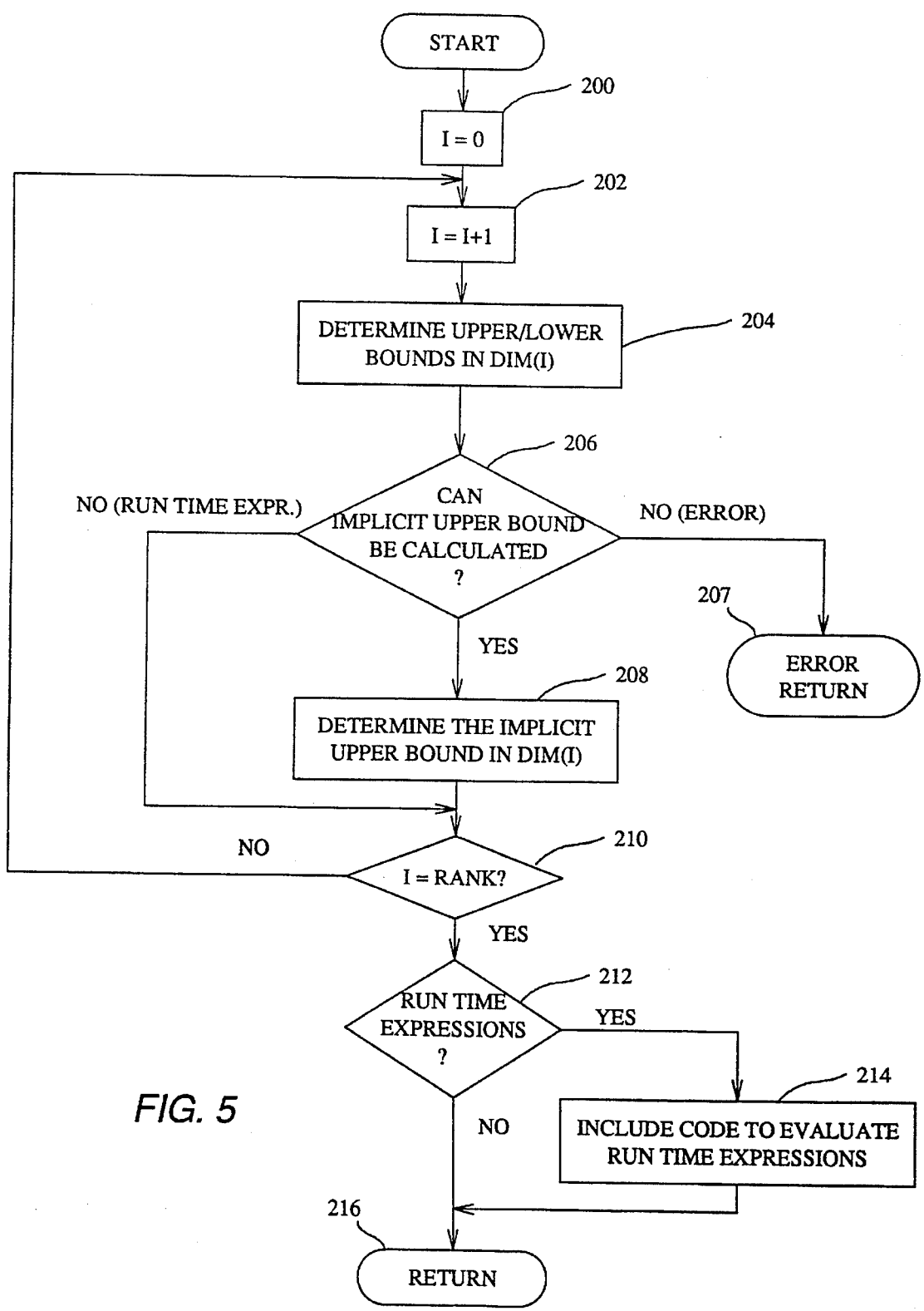
FIG. 5 is a flowchart illustrating the steps a compiler goes through in converting program code having an arbitrary dimension size array into executable code having implicit array bounds which are powers of two.

A software flowchart which illustrates the software and corresponding steps of compiler 10 in executing one embodiment of such a compiler routine is shown in FIG. 5. Compiler 10 begins at 200 by initializing the dimension index I. At 202, compiler 10 increments dimension index I and at 204 places the declared upper and lower bounds for dimension I into the ith dimension field of the symbol table entry for that array. (If there is no declared lower bound, compiler 10 will place a default value in the lower bound field.)

If either the upper or the lower bound is a run time expression, that condition is noted. Otherwise a constant is placed into each field in the symbol table entry. In one embodiment, the symbol table entry contains a flag associated with each dimension bound. If a dimension bound is to be determined from a run time expression, the corresponding flag is set.

At 206, compiler 10 determines if an implicit upper bound can be calculated from the lower bound and the declared upper bound. If so, at 208, compiler 10 enters a constant into the implicit upper bound field of the ith dimension field of the symbol table entry for that array and control moves to 210. If an implicit upper bound cannot be calculated because its corresponding lower or declared upper bound is a run time expression, control moves to 210. If an implicit upper cannot be calculated because of some other reason, control moves to 207 and an error message is generated.

At 210 a check is made as to whether all dimensions have been addressed. If not, control moves to 202, dimension index I is incremented and control moves to 204. If, however, all dimensions have been addressed, control moves to 212 and a check is made as to whether any of the lower or declared upper bounds are run time expressions. If not, all bounds are constants and compiler 10 returns.

If, however, a check at 212 indicates that one or more of the lower or declared upper bounds are run time expressions, control moves to 214 and code is inserted in the entry sequence of a subroutine to compute the run time expressions and the corresponding implicit upper bounds at run time. Control then moves to 216 and compiler 10 returns.

Figure 6:
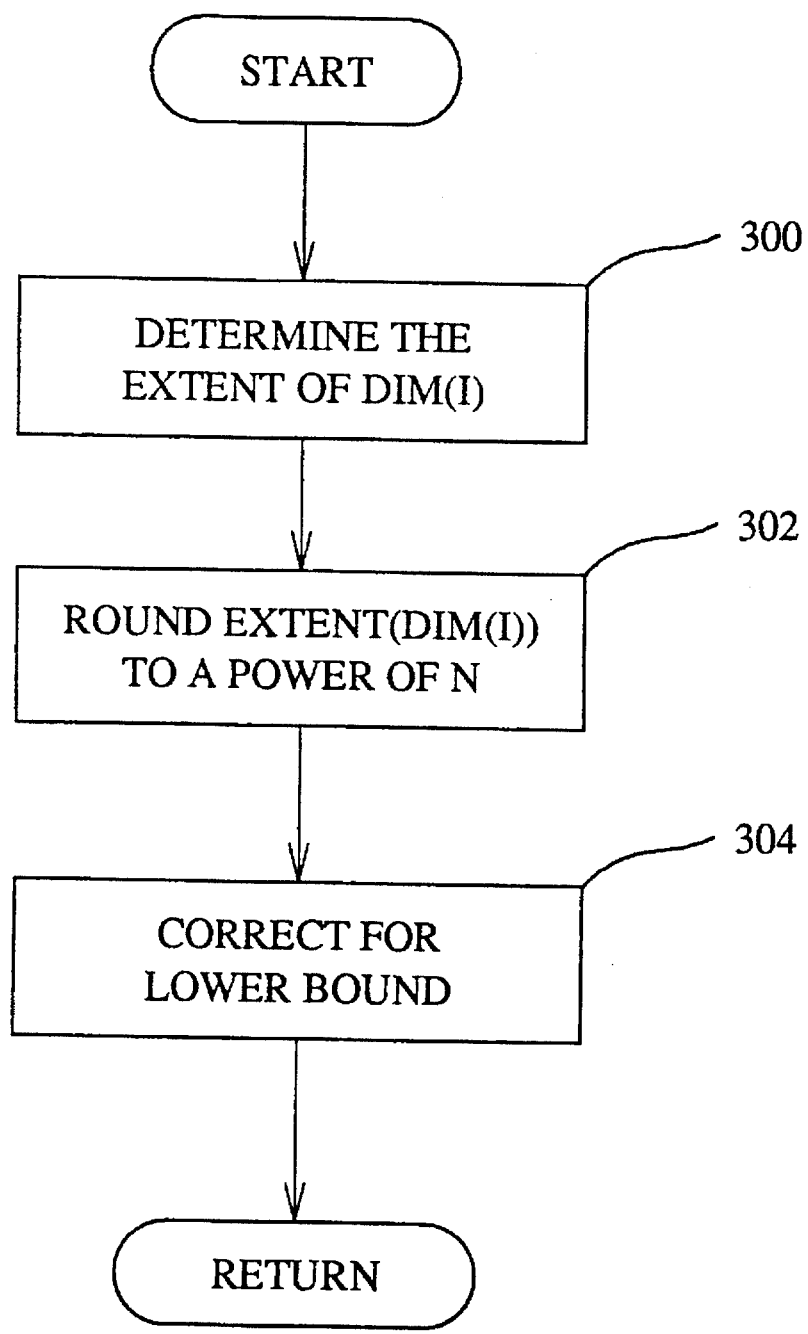
FIG. 6 is a flowchart illustrating the steps taken in calculating an implicit upper bound.

A flowchart which illustrates the steps taken in determining an implicit upper bound within a dimension I is shown in FIG. 6. Such a flowchart could be used to advantage in step 208 of FIG. 5. In FIG. 6, at 300 the extent of dimension I is determined. In one embodiment, the extent of a dimension I is calculated by subtracting the lower bound in that dimension from the upper bound in that dimension and adding one. Control then moves to 302.

At 302 the extent determined at 300 is rounded to a power of N. As detailed above, N can be any number which simplifies calculation of the PE and the offset. In one embodiment N equals two and the extent of dimension I is rounded to the next higher power of two. Control then moves to 304. In one such embodiment, a check is made at 302 to see if the extent is already a power of two. If so, no rounding up occurs.

At 304 the rounded value calculated at 302 is corrected to account for any offset due to the lower bound. In one such embodiment, the corrected value is determined by adding the lower bound in that dimension to the rounded value and subtracting one.

Although the present invention has been described with reference to the preferred embodiments, those skilled in the art will recognize that changes may be made in form and detail without departing from the spirit and scope of the invention.

What is claimed is:

1. In a computing system having memory, a method of ensuring that the extent of a dimension of an array is a power of N, the method comprising the steps of:

creating a symbol table in memory, wherein the symbol table includes a symbol table entry comprising an array identifier and an array dimension field associated with the array dimension, wherein the array dimension field comprises a lower bound and a declared upper bound;

calculating an implicit upper bound for the array dimension, wherein the step of calculating the implicit upper bound comprises the steps of:
determining the extent of the array dimension;
rounding the extent up to a power of N; and
correcting for the lower bound;

storing the calculated implicit upper bound within the array dimension field; and using the stored calculated implicit upper bound to allocate memory for the array.

2. The method according to claim 1 wherein N equals the number of logic levels available.

3. The method according to claim 1 wherein N equals two.

4. The method according to claim 1 wherein the step of determining the extent of the array dimension comprises the steps of subtracting the lower bound from the declared upper bound and adding one.

5. The method according to claim 4 wherein the step of correcting for the lower bound comprises the steps of:

adding the lower bound to the extent to form a result; and subtracting one from the result in order to form the implicit upper bound.

6. The method according to claim 1 wherein the step of correcting for the lower bound comprises the steps of:

adding the lower bound to the extent to form a result; and subtracting one from the result in order to form the implicit upper bound.

7. A method of extending an array having a plurality of dimensions so that each dimension is a power of N, wherein the plurality of dimensions includes a first and a second dimension, the method comprising the steps of:

providing a symbol table, wherein the symbol table includes a symbol table entry comprising an array name and first and second dimension fields corresponding to the first and second dimensions, respectively, wherein each dimension field comprises a lower bound and a declared upper bound;

calculating a first dimension implicit upper bound, wherein the step of calculating the first dimension implicit upper bound comprises the steps of:

determining a first value equal to the extent of the first dimension;

rounding the first value up to a power of N; and correcting for the first dimension lower bound;

calculating a second dimension implicit upper bound, wherein the step of calculating the second dimension implicit upper bound comprises the steps of:

determining a second value equal to the extent of the second dimension;

rounding the second value up to a power of N; and correcting for the second dimension lower bound; and storing the first and second dimension implicit upper bounds.

8. The method according to claim 7 wherein N equals the number of logic levels available.

9. The method according to claim 7 wherein N equals two.

10. The method according to claim 7 wherein the step of determining the extent of the first array dimension comprises the steps of subtracting the first dimension lower bound from the first dimension declared upper bound and adding one.

11. The method according to claim 10 wherein the step of correcting for the first dimension lower bound comprises the steps of:

adding the first dimension lower bound to the first value to form a result; and subtracting one from the result in order to form the first dimension implicit upper bound.

12. The method according to claim 7 wherein the step of correcting for the first dimension lower bound comprises the steps of:

adding the first dimension lower bound to the first value to form a result; and subtracting one from the result in order to form the first dimension implicit upper bound.

13. A method of compiling computer code, wherein the method comprises the steps of:

providing program code including a statement declaring an array having a dimension with an extent defined by a run time expression;

forming a symbol table, wherein the symbol table includes a symbol table entry comprising an array identifier and an array dimension field defining the dimension, wherein the array dimension field comprises a lower bound field, a declared upper bound field and an implicit upper bound field; and replacing the program code with object code, wherein the step of replacing comprises the steps of:

replacing the array declaration statement with object code used to compute the dimension extent from the run time expression, wherein the object code includes instructions for determining a lower bound and a declared upper bound for the dimension; and adding object code used to calculate the implicit upper bound, wherein the implicit upper bound calculating object code comprises object code for rounding the extent up to a power of N and for correcting for the lower bound of the dimension.

14. The method according to claim 13 wherein the step of forming a symbol table comprises the step of setting a flag associated with the lower bound field if the lower bound is to be determined from a run time expression.

15. The method according to claim 13 wherein the step of forming a symbol table comprises the step of setting a flag associated with the declared upper bound field if the declared upper bound is to be determined from a run time expression.

16. A system for compiling computer code for use in a parallel processing system having a plurality of processing elements, the system comprising:

memory, wherein the memory Comprises program code including a statement declaring an array having a dimension with an extent defined by a run time expression;

means for forming a symbol table within the memory, wherein the symbol table includes a symbol table entry comprising an array identifier and an array dimension field defining the dimension, wherein the array dimension field comprises a lower bound field, a declared upper bound field and an implicit upper bound field; and means for generating memory allocation object code in which memory allocation for the array is a function of the lower bound field and the implicit upper bound field; and means for generating calculation object code limiting operations on the array as a function of the lower bound field and the declared upper bound field.

17. The system according to claim 16 wherein the means for generating memory allocation object code comprise:

means for replacing the array declaration statement with object code used to compute the dimension extent from the run time expression, wherein the object code includes instructions for determining a lower bound and a declared upper bound for the dimension; and means for adding object code used to calculate the implicit upper bound, wherein the implicit upper bound calculating object code comprises object code for rounding the extent up to a power of N and for correcting for the lower bound of the dimension.

* * * * *